United States Patent
Kudo

(10) Patent No.: US 8,400,657 B2
(45) Date of Patent: Mar. 19, 2013

(54) DATA UTILIZATION DEVICE, DATA UTILIZATION METHOD, AND DATA UTILIZATION SYSTEM

(75) Inventor: Yasuhiro Kudo, Ichinomiya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 634 days.

(21) Appl. No.: 12/395,415

(22) Filed: Feb. 27, 2009

(65) Prior Publication Data
US 2009/0244606 A1    Oct. 1, 2009

(30) Foreign Application Priority Data
Mar. 26, 2008  (JP) .................................. 2008-081637

(51) Int. Cl.
G06F 3/12    (2006.01)
(52) U.S. Cl. ...................................................... 358/1.15
(58) Field of Classification Search .................. None
See application file for complete search history.

(56) References Cited

U.S. PATENT DOCUMENTS

| 7,460,261 | B2 * | 12/2008 | Itoh ............................... 358/1.15 |
| 7,913,296 | B2 * | 3/2011 | Shigeeda ........................... 726/5 |
| 2003/0233455 | A1 * | 12/2003 | Leber et al. .................... 709/226 |
| 2006/0136566 | A1 |  6/2006 | Ohara et al. |

FOREIGN PATENT DOCUMENTS
JP    2006-135699 A    5/2006
* cited by examiner

Primary Examiner — Marivelisse Santiago Cordero
Assistant Examiner — John Wallace
(74) Attorney, Agent, or Firm — Baker Botts L.L.P.

(57) ABSTRACT

A data utilization device is provided. The data utilization device includes an information storing unit; a first command receiving unit that receives a first command from a terminal device; a second command transmitting unit that transmits a second command to a server specified by the first command; a server registration item receiving unit that receives server registration items from the server; a third command transmitting unit that transmits a third command including the server registration items to the terminal device; a server registration information receiving unit that receives server registration information from the terminal device; a fourth command transmitting unit that transmits a fourth command including the server registration information to the server; a response receiving unit that receives from the server a response to the fourth command; and a storage control unit that stores the data utilization information if the response is an affirmative response.

9 Claims, 8 Drawing Sheets

| SERVER URL | http://news.example.com/regist/ |
|---|---|
| KIND OF DATA | SPORTS NEWS |
| PRINTING RESOLUTION | 600dpi |
| PRINTING MAGNIFICATION | EQUAL MAGNIFICATION |

112  110  114

DATA UTILIZATION DEVICE, DATA UTILIZATION METHOD, AND DATA UTILIZATION SYSTEM

CROSS-REFERENCE TO RELATED APPLICATIONS

This application claims priority from Japanese Patent Application No. 2008-081637 filed on Mar. 26, 2008, the entire contents of which are incorporated herein by reference.

TECHNICAL FIELD

Devices and systems consistent with the present invention relate to a data utilization device which utilizes data supplied from a server, a data utilization method and a data utilization system.

BACKGROUND

There is a server which supplies, via a network, various types of data (such as, e.g., news and advertisements) to a data utilization device which is registered. In order to receive data from the server, a user is required to register in advance information on the data utilization device to which data is supplied (such as, e.g., a device ID of the data utilization device and a type of data to be supplied) in the server. Further, the data utilization device must store data utilization information (such as, e.g., an URL of the server and a type of data) for utilizing data supplied from the server.

For example, in JP-A-2006-135699, a server transmits to a user terminal (i.e., a terminal device) server registration items corresponding to server registration information necessary for registering the user terminal. A display device of the user terminal displays the server registration items. A user operates an operation device, thus making it possible to input the server registration information. The user terminal transmits the server registration information input by the user to the server. Upon receipt of the server registration information, the server transmits the data utilization information necessary for receiving data to the user terminal. The user terminal transmits the data utilization information received from the server to a data utilization device. The data utilization device stores the data utilization information received from the user terminal.

Accordingly, in registering the data utilization device in the server, the user uses the user terminal, thus making it possible to input the server registration information. Therefore, when a data utilization device not fully equipped with an operation device or a display device (for example, a printer only equipped with a numeric keypad) is registered in the server, the user is able to use another user terminal fully equipped with an operation device and a display device. Thereby, it is possible to alleviate input work of the server registration information performed by the user.

SUMMARY

It is an aspect of the present invention to provide for registering of data utilization information in a data utilization device and also registering of server registration information in a server.

According to an illustrative aspect of the present invention, there is provided a data utilization device that is to be connected to a terminal device and a server, the data utilization device comprising: a data utilization information storing unit that stores data utilization information for using data; a first command receiving unit that receives a first command from the terminal device; a second command transmitting unit that transmits a second command to the server specified by address information included in the first command; a server registration item receiving unit that receives server registration items from the server, in response to the second command transmitting unit transmitting the second command; a third command transmitting unit that transmits a third command including the server registration items to the terminal device; a server registration information receiving unit that receives server registration information from the terminal device, in response to the third command transmitting unit transmitting the third command; a fourth command transmitting unit that transmits a fourth command including the server registration information to the server; a response receiving unit that receives from the server a response with respect to the supply of data to be utilized, in response to the fourth command transmitting unit transmitting the fourth command; and a storage control unit that controls the data utilization information storing unit to store the data utilization information for using the data supplied from the server if the response is an affirmative response.

According to another exemplary embodiment of the present invention, there is provided a data utilizing method in a data utilization device that is to be connected to a terminal device and a server, the data utilizing method comprising: receiving a first command from the terminal device; transmitting a second command to the server specified by address information included in the first command; receiving server registration items from the server in response to the second command; transmitting a third command including the server registration items to the terminal device; receiving server registration information from the terminal device in response to the third command; transmitting a fourth command including the server registration information to the server; receiving, from the server, a response with respect to the supply of data to be utilized, in response to the fourth command; and controlling a data utilization information storing unit to store data utilization information for using the data supplied from the server if the response is an affirmative response.

According to yet another exemplary embodiment of the present invention, there is provided a data utilization system that is provided with a server for supplying data, a data utilization device capable of utilizing data supplied from the server and a terminal device coupled to the data utilization device so as to make communication possible, the data utilization device comprising: a data utilization information storing unit that stores data utilization information for using the data supplied from the server; a first command receiving unit that receives a first command transmitted from the terminal device; a second command transmitting unit that transmits a second command to the server specified by address information included in the first command; a server registration item receiving unit that receives server registration items transmitted from the server in response to the second command; a third command transmitting unit that transmits a third command including the server registration items to the terminal device; a server registration information receiving unit that receives the server registration information transmitted from the terminal device in response to the third command; a fourth command transmitting unit that transmits a fourth command including the server registration information to the server; a response receiving unit that receives from the server a response with respect to the supply of data to be utilized, in response to the fourth command; and a storage control unit that controls the data utilization information storing unit to store the data utilization information for utilizing the data supplied from the server if the response received in response to the fourth command is an affirmative response, the server comprising: a second command receiving unit that receives the second command transmitted from the data utilization device; a server registration item transmitting unit that transmits the server registration items to the data utilization device in response to the second command; a fourth command receiving unit that receives the fourth command transmitted from the data utilization device; a registration processing execution unit that executes registration processing for registering the data utilization device on the basis of the server registration information included in the fourth command; and a response transmitting unit that transmits an affirmative response to the data utilization device on a condition that the data utilization device is successfully registered by the registration processing execution unit, and the terminal device comprising: a first command transmitting unit that transmits the first command including address information of the server to the data utilization device; a third command receiving unit that receives the third command transmitted from the data utilization device in response to the first command; an output unit that outputs the server registration items included in the third command; an input permitting unit that permits input of the server registration information corresponding to the server registration items output by the output unit; and a server registration information transmitting unit that transmits the server registration information input by the input permitting unit to the data utilization device.

DESCRIPTION OF EXEMPLARY EMBODIMENTS OF THE PRESENT INVENTION

Figure 1:
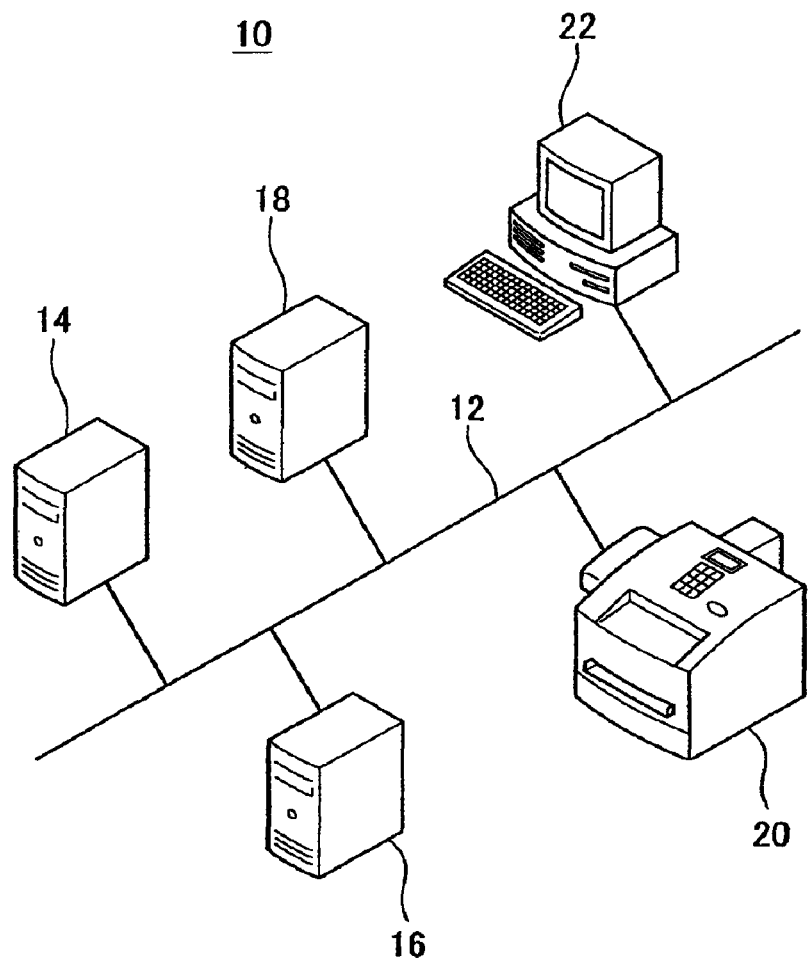
FIG. 1 is a schematic diagram showing a data utilization system according to an exemplary embodiment of the present invention.

Exemplary embodiments will now be described by referring to the drawings. FIG. 1 shows a constitution of a data utilization system 10 according to an exemplary embodiment of the present invention. The data utilization system 10 is provided with a plurality of servers 14, 16, 18, a multi-function device 20 and a PC 22. The servers 14, 16, 18, the multi-function device 20 and the PC 22 are constituted separately. These devices 14, 16, 18, 20, 22 are coupled to each other so as to make communication possible via a network line 12.

(Server)

Figure 2:
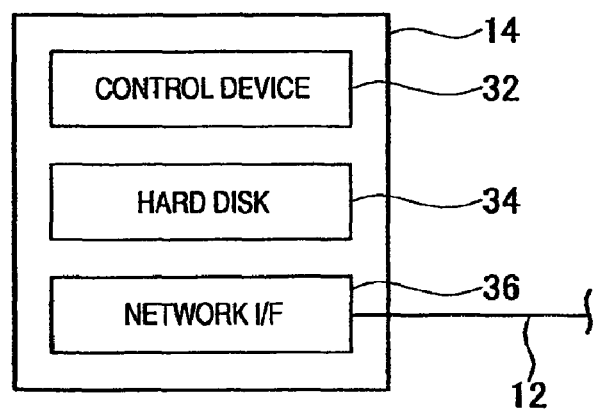
FIG. 2 shows a constitution of a server of the data utilization system of FIG. 1.

FIG. 2 shows an example of a constitution of the server 14. The server 14 is provided with a control device 32, a hard disk 34 and a network interface 36. The control device 32 executes various types of processing in accordance with programs, thereby controlling operations of the server 14 in a comprehensive manner. The programs may be previously set. The content of processing executed by the control device 32 will be described later in detail. The hard disk 34 is able to store various types of information. The hard disk 34 stores programs by which the control device 32 controls the operations of the server 14. The hard disk 34 is also able to store a server registration information list 100 of individual devices to which data is supplied (refer to FIG. 3). The content of the server registration information list 100 will be described later in detail. The network interface 36 is coupled with the network line 12. The server 14 is able to communicate with the multi-function device 20 via the network interface 36. The control device 32 is able to supply data via the network interface 36 to individual devices (not illustrated) registered in the server.

The servers 16, 18 are similar in constitution to server 14. Therefore, a detailed description of the servers 16, 18 will be omitted here. The servers 16, 18 are coupled to the multi-function device 20 so as to make communication possible as with the server 14. It is noted that there is no restriction on the number of servers coupled to the multi-function device 20. In the present exemplary embodiment, for the purpose of simplifying the description, only three servers, i.e., servers 14, 16, and 18, are coupled to the multi-function device 20.

(Server Registration Information List)

Figure 3:
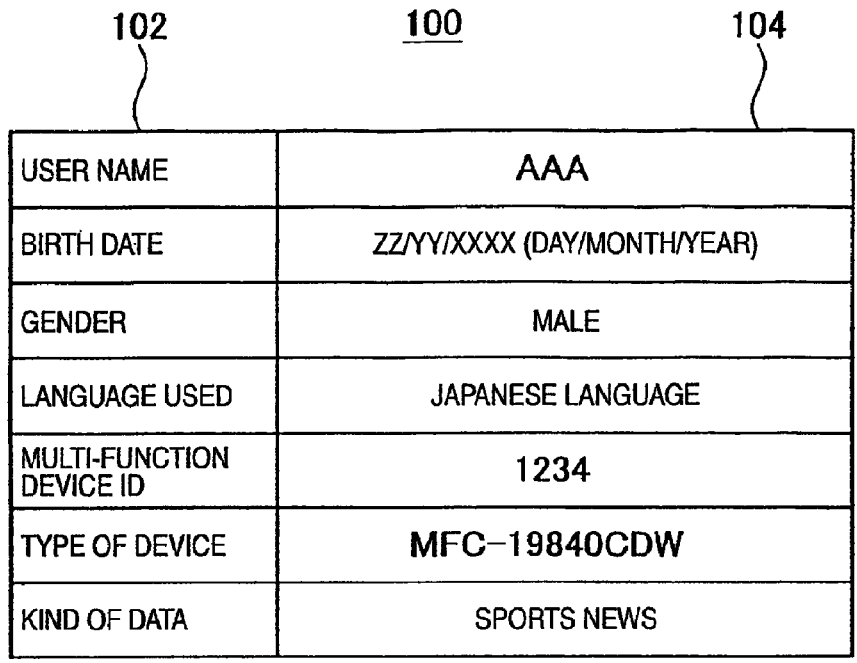
FIG. 3 shows an example of a server registration information list.

FIG. 3 shows an example of the content of the server registration information list 100. The server registration information list 100 is provided with server registration items 102 and server registration information 104. The server registration items 102 are items corresponding to information used for the server 14 to supply data to devices on a network. The server registration items 102 of the present exemplary embodiment include, for example, user name, birth date, gender, language used, multi-function device ID, type of device, and kind of data, etc. The user name, birth date, gender, and language used can be translated into information on a user of a multi-function device to which data is supplied from the server 14. The multi-function device ID and the type of device can be translated into information on the multi-function device to which data is supplied from the server 14. The multi-function device ID may be a MAC address or an IP address of the multi-function device. The kind of data is the kind of data supplied by the server. The server registration item 102 may be changed, depending, for example, on the kind of the server. For example, where the server supplies only one kind of data, the kind of data item may be omitted. Alternatively, where the server supplies data only in the Japanese language as the language used, the item indicating the language used may be omitted. Further, for example, the server registration item 102 may have other items indicating "nationality" and the like. The server registration information 104 is information corresponding to each of the server registration items 102.

(Multi-Function Device)

Figure 4:
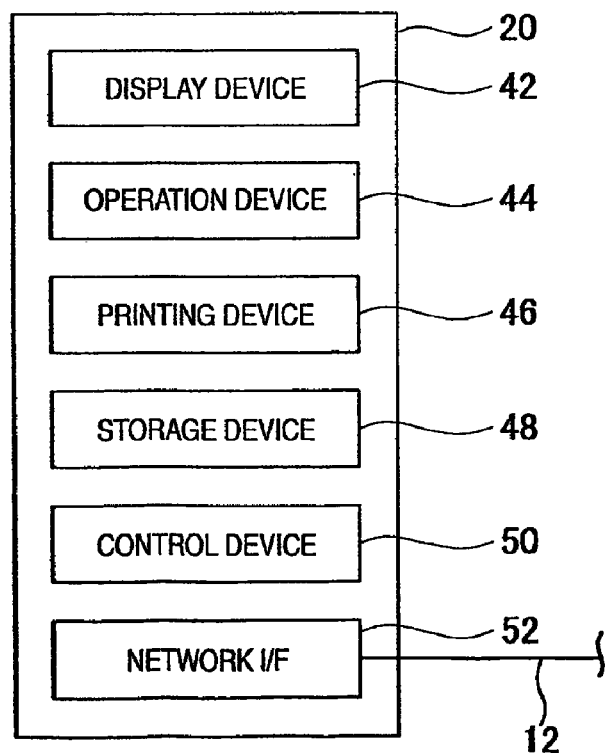
FIG. 4 shows a constitution of a multi-function device of the data utilization system of FIG. 1.

FIG. 4 shows an example of the constitution of the multi-function device 20 according to an exemplary embodiment of the present invention. The multi-function device 20 is provided with a display device 42, an operation device 44, a printing device 46, a storage device 48, a control device 50 and a network interface 52. The display device 42 is able to display various types of information. The operation device 44 is provided with a plurality of keys (e.g., a numeric keypad, a start key, a cancellation key and the like). The operation device 44 may be operated by a user, thus making it possible to input various types of information and instructions into the multi-function device 20. Alternatively, the information and instructions may be input automatically. The printing device 46 is capable of printing print data on a print medium. The print data includes data supplied from the servers 14, 16, 18 and that sent from outside the multi-function device 20 (for example, from the PC 22). The storage device 48 is able to store various types of information. The storage device 48 is able to store a data utilization information list 110 for having a supply of data from the servers 14, 16, 18 (refer to FIG. 5). The content of the data utilization information list 110 will be described later in detail. The control device 50 executes various types of processing in accordance with programs, thereby controlling motions of the multi-function device 20 in a comprehensive manner. The programs may be previously set.

The network interface 52 is coupled with a network line 12. The multi-function device 20 is able to communicate via the network interface 52 with the servers 14, 16, 18. Further, the network line 12 is coupled to the PC 22 via a HUB, a router and the like. The multi-function device 20 is able to communicate via the network interface 52 with the PC 22.

The multi-function device 20 is constituted so as to execute not only a printing function but also other functions (e.g., a scanning function and/or a facsimile communication function).

(Data Information List)

Figures 5, 6:
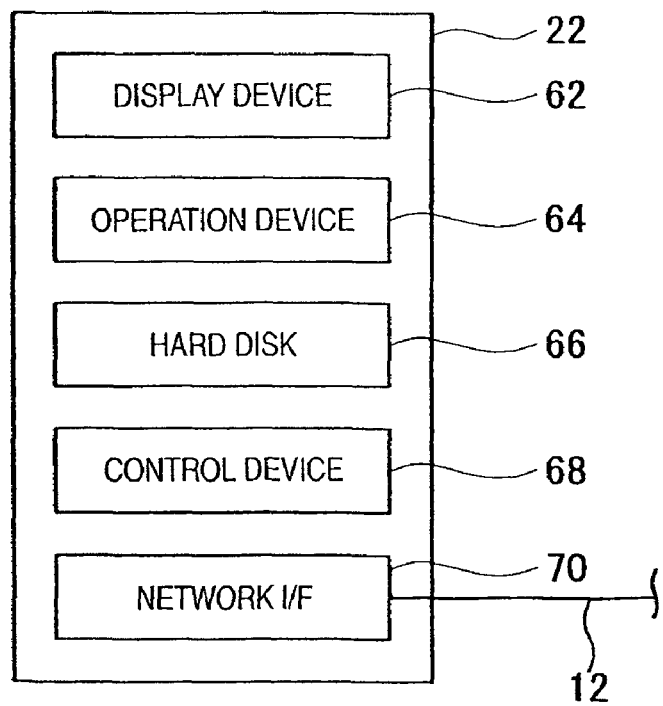
FIG. 5 shows an example of a data utilization information list.
FIG. 6 shows a constitution of a personal computer (PC) of the data utilization system of FIG. 1.

FIG. 5 shows an example of a constitution of the data utilization information list 110. The data utilization information list 110 is provided with data utilization items 112 and data utilization information 114. The data utilization items 112 are items corresponding to information used for the multi-function device 20 to print (i.e., use) data supplied from the servers 14, 16, 18. The data utilization items 112 of the present exemplary embodiment include, for example, server URL, kind of data, printing resolution and printing magnification. The server URL may be translated into information on a server which supplies data to the multi-function device 20. The kind of data is the kind of data supplied by the server. The printing resolution and the printing magnification may be translated into setting information so that the multi-function device 20 can use data. The data utilization item 112 may be changed, depending on the kind of servers or the kind of multi-function devices. For example, where the server supplies only one kind of data and the server does not include the kind of data in the server registration items, the item indicating the kind of data may be omitted from the data utilization list 110. The data utilization item 112 may also include additional items such as "both side/one side printing" by which both side printing or one side printing may be selected. The data utilization information 114 is information corresponding to each of the data utilization items 112.

(PC)

FIG. 6 shows an example constitution of the PC 22 according to an exemplary embodiment of the present invention. The PC 22 is provided with a display device 62, an operation device 64, a hard disk 66, a control device 68, and a network interface 70. The display device 62 is able to display various types of information. The operation device 64 is provided with a keyboard, a mouse and others. The operation device 64 may be operated by a user, thus making it possible to input various types of information and instructions into the PC 22. Alternatively, information and instructions may be input into the PC 22 automatically. The hard disk 66 is able to store various types of information. The control device 68 executes various types of processing in accordance with programs, thereby controlling motions of the PC 22 in a comprehensive manner. The programs may be previously set.

The network interface 70 is coupled with a network line 12. The network line 12 is coupled via a HUB, a router or the like to the multi-function device 20. The PC 22 is able to communicate via the network interface 70 with the multi-function device 20.

(Registration Processing)

Figure 7:
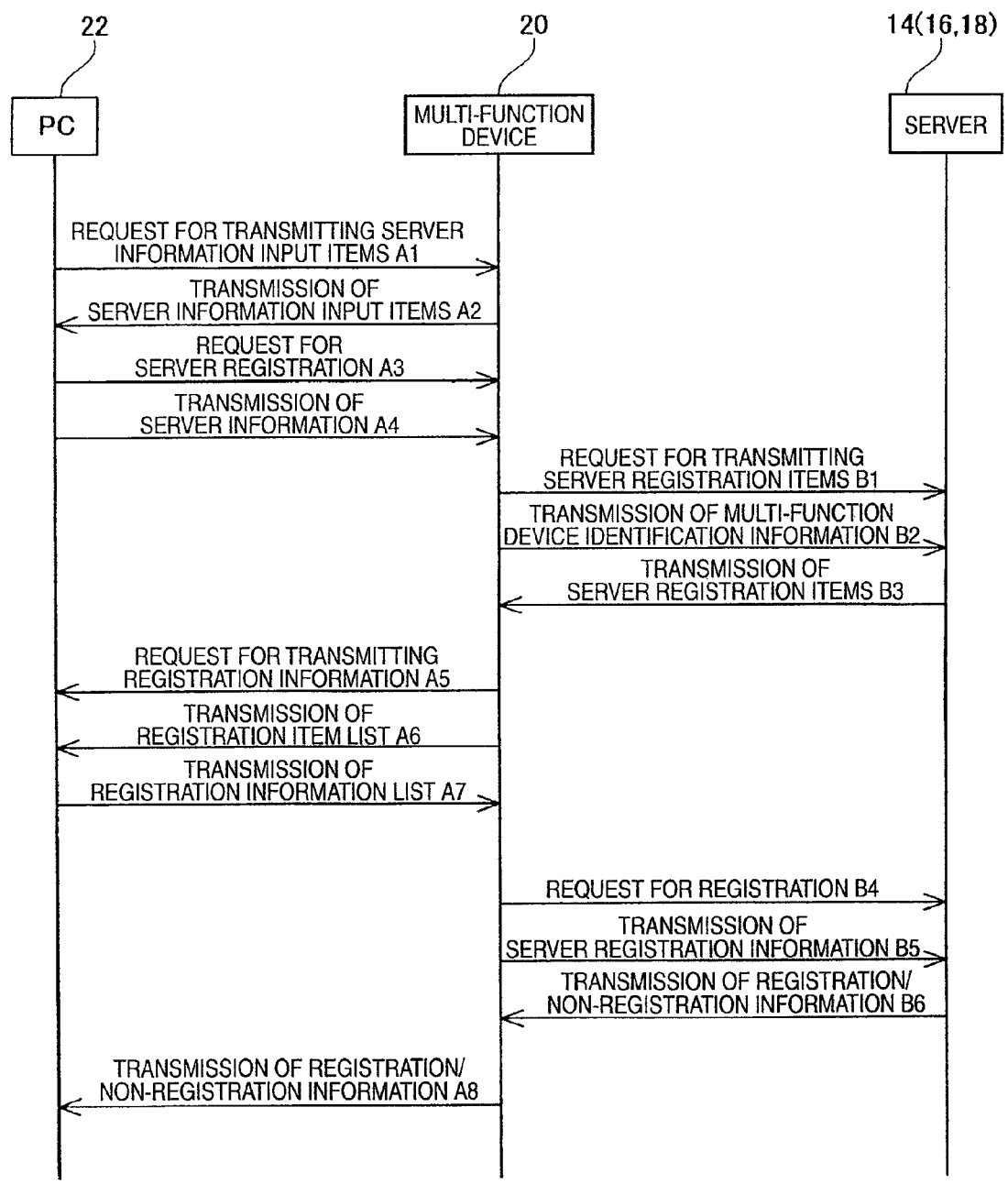
FIG. 7 is a time chart showing the processing executed in registration processing according to an exemplary embodiment of the present invention.

A description will now be given of registration processing for registering the multi-function device 20 in the server 14. First, the processing executed by each of the above devices 14, 20, 22 will be briefly described. FIG. 7 is a time chart showing the processing executed by each of the devices, i.e., by the server 14, the multi-function device 20, the PC 22. A request for transmitting server information input items (A1) to the multi-function device 20 is input to the operation device 64 of the PC 22. The multi-function device 20 transmits server information input items to the PC 22 according to the request for transmitting server information input items transmitted from the PC 22 (A2). The server information input items include items corresponding to an Uniform Resource Locator (URL) of the server and a language used. The PC 22 displays the server information input items transmitted from the multi-function device 20 on the display device 62. The operation device 64 is operated, thus making it possible to input information corresponding to the server information input items. The PC 22 transmits a request for server registration (A3) and server information of the server 14 to the multi-function device 20 (A4).

The multi-function device 20 receives the request for server registration transmitted from the PC 22. The multi-function device 20 is able to specify a server which should execute the following registration processing on the basis of server information (e.g., the URL of the server) included in the request for server registration. In the present exemplary embodiment, the following description will be given on the assumption that the server 14 has been specified. The multi-function device 20 transmits a request for transmitting server registration items (B1) and identification information of the multi-function device 20 according to the request for server registration transmitted from the PC 22 to the server 14 (B2). The identification information of the multi-function device 20 includes, for example, information by which the server 14 can communicate with the multi-function device 20 (e.g., address information of the multi-function device 20). The server 14 transmits the server registration items 102 (refer to FIG. 3) to the multi-function device 20 according to the request for transmitting server registration items transmitted by the multi-function device 20 (B3).

The multi-function device 20 selects registration items to be transmitted to the PC 22 among the server registration items 102 transmitted from the server 14 and the data utilization items 112 (refer to FIG. 5). As a result, a registration item list is prepared and transmitted, as described below. The content of processing for selecting items to be transmitted to the PC 22 by the multi-function device 20 will be described later in detail.

The multi-function device 20 transmits a request for transmitting registration information (A5) and the prepared registration item list to the PC 22 (A6). The PC 22 displays on the display device 62 the registration item list transmitted from the multi-function device 20 according to the request for transmitting registration information made by the multi-function device 20. The operation device 64 is operated, thus making it possible to input information corresponding to each of the registration items. The PC 22 transmits the registration information list to the multi-function device 20 (A7).

The multi-function device 20 transmits to the server 14 a request for registration (B4) and server registration information corresponding to the server registration items 102 (B5). The server 14 utilizes the server registration information according to the request for registration transmitted by the multi-function device 20, thereby executing registration processing. The server 14 transmits to the multi-function device 20 registration/non-registration information on whether the registration processing is completed (B6). Where information on completed registration processing is received from the server 14, the multi-function device 20 allows the storage device 48 to store the data utilization information. The multi-function device 20 transmits the registration/non-registration information transmitted from the server 14 to the PC 22 (A8). The PC 22 is able to display the registration/non-registration information transmitted from the multi-function device 20 on the display device 62.

(Processing by Multi-Function Device)

Figure 8:
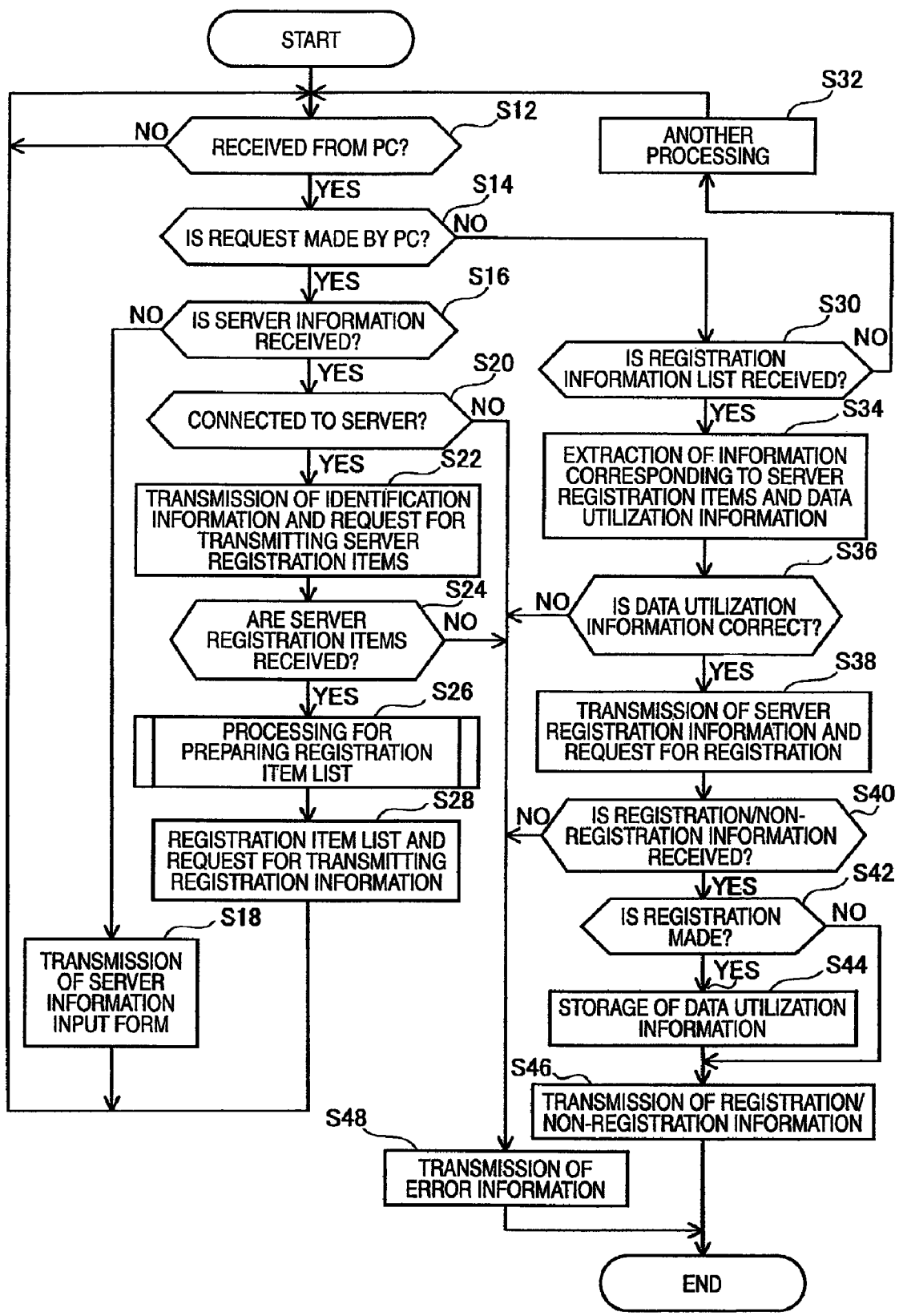
FIG. 8 is a flowchart showing the registration processing executed by the multi-function device according to an exemplary embodiment of the present invention.

FIG. 8 is a flowchart showing an example of procedures for the registration processing executed by the control device 50 of the multi-function device 20. The control device 50 monitors the receipt of information from the PC 22 (S12). Upon receipt of information from the PC (YES in S12), the control device 50 confirms whether the received information is a request from the PC 22 (S14). Specifically, confirmation is made for whether the information received in S12 is a request indicated in A1 or A3 of FIG. 7. Where the request from the PC 22 is received (YES in S14), the control device 50 confirms whether server information is received after the request (S16). Specifically, confirmation is made of whether the request determined to be YES in S14 is a request given in A3 of FIG. 7. Where no server information is received (NO in S16; A1 of FIG. 7), the control device 50 transmits the server information input items to the PC 22 (S18; A2 of FIG. 7) and returns to S12.

On the other hand, where the server information is received (YES in S16; A3, A4 of FIG. 7), the control device 50 tries to establish a connection with a server specified by a URL included in the server information. It is noted that in the present exemplary embodiment, the following description will be given on the assumption that the server information received in S16 corresponds to the server 14. The control device 50 transmits a signal to the server 14, thereby monitoring receipt of the response. The signal may be predetermined. The control device 50 determines the presence or absence of a response, thereby confirming whether the control device 50 can be coupled to the server 14 (S20). Where no response is received (NO in S20), specifically, the control device 50 is not coupled to the server 14, the control device 50 proceeds to S48. Where the response is received (YES in S20), the control device 50 transmits to the server 14 identification information of the multi-function device 20 and a request for transmitting server registration items (S22; B1, B2 of FIG. 7).

The control device 50 confirms whether the server registration items 102 are received from the server 14 (S24). Specifically, where a timer (not illustrated) equipped on the control device 50 is used to measure a time from which the request for transmitting server registration items is transmitted and if, after a lapse of a threshold time, the request for transmitting server registration items is not received, the control device 50 determines that no server registration items 102 are received. Where no server registration items 102 are received from the server 14 (NO in S24), the control device 50 proceeds to S48.

Where the server registration items 102 are received from the server 14 (YES in S24; B3 of FIG. 7), the control device 50 executes processing for preparing the registration item list (S26). The processing for preparing the registration item list will be described later in detail. The control device 50 transmits to the PC 22 the request for transmitting registration information and the registration item list prepared by the processing for preparing the registration item list (S28; A5, A6 of FIG. 7) and returns to S12.

Where no request is received from the PC 22 (NO in S14), the control device 50 confirms whether the registration information list is received (S30). Specifically, confirmation is made of whether the information received in S12 is the list in A7 of FIG. 7. Where no registration information list is received (NO in S30), the control device 50 executes another processing in accordance with the information received from the PC 22 (S32). On the other hand, where the registration information list is received (YES in S30; A7 of FIG. 7), information corresponding to the server registration items 102 and information corresponding to the data utilization items 112 are extracted from information included in the registration information list (S34). The control device 50 confirms whether information corresponding to all the data utilization items 112 is included (S36). Where information corresponding to at least one of the data utilization items 112 is not included (NO in S36), the control device 50 proceeds to S48.

On the other hand, where information corresponding to all the data utilization items 112 is included (YES in S36), the control device 50 transmits to the server 14 a request for registration and information corresponding to the server registration items (S38; B4, B5 of FIG. 7). The control device 50 confirms whether registration/non-registration information is received from the server 14 (S40). Where the registration/non-registration information is not received within a threshold time (NO in S40), the control device 50 proceeds to S48. The threshold time may be predetermined. On the other hand, where the registration/non-registration information is received (YES in S40; B6 of FIG. 7), the control device 50 confirms whether the multi-function device 20 is registered in the server 14 (S42). Specifically, confirmation is made of whether the registration/non-registration information is affirmative. Where the multi-function device 20 is registered in the server 14 (YES in S42), the control device 50 allows the storage device 48 to store information corresponding to the data utilization items 112 as the data utilization information list 110 (S44). On the other hand, where the multi-function device 20 is not registered in the server 14 (NO in S42), the control device 50 does not execute the processing of S44 but proceeds to S46. The control device 50 transmits the registration/non-registration information to the PC 22 (S46) and terminates the processing.

In S48, the control device 50 transmits error information to the PC 22 and terminates the processing. When proceeding from S20 to S48, the control device 50 transmits to the PC 22 information which indicates a failure in connecting to the server 14. When proceeding from S24 to S48, the control device 50 transmits to the PC 22 information indicating a failure in receiving the server registration items from the server 14. When proceeding from S36 to S48, the control device 50 transmits to the PC 22 information indicating an error in the input information. When proceeding from S40 to S48, the control device 50 transmits to the PC 22 information indicating a failure in receiving the registration/non-registration information.

(Preparing the Registration Item List)

Figure 9:
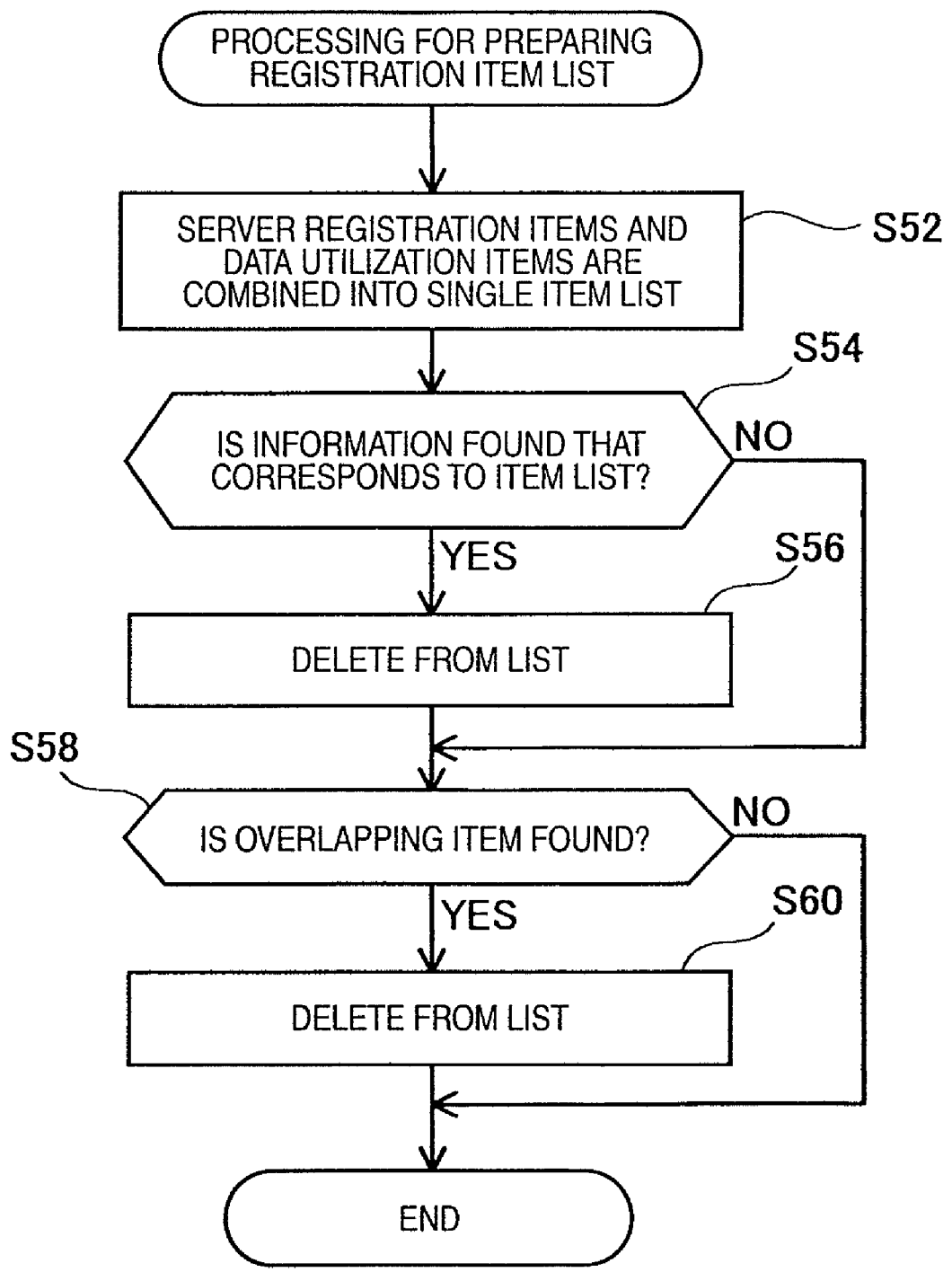
FIG. 9 is a flowchart showing the processing for preparing a registration item list according to an exemplary embodiment of the present invention.

FIG. 9 is a flowchart showing an example of procedures for preparing the registration item list in S26 of FIG. 8 executed by the control device 50. Upon receipt of server registration items 102 from the server 14, the control device 50 combines the data utilization items 112 and the server registration items 102 stored in the storage device 48, thereby preparing an item list (S52). Specifically, the item list includes user name, birth date, gender, language used, multi-function device ID, type of device, kind of data (the items described so far fall under the data utilization items 112, while others fall under the server registration items 102), server URL, kind of data, printing resolution, and printing magnification. The control device 50 searches for an item corresponding to information stored previously in the storage device 48 from the item list prepared in S52 (S54). In the case in which an item corresponding to the information previously stored in the storage device 48 is found in the item list (YES in S54), the item is deleted from the item list (S56). For example, of the server registration items 102, the "multi-function device ID" and the "type of device" are previously stored in the storage device 48. In this instance, the "multi-function device ID" and the "type of device" are deleted from the item list prepared in S52. Further, since the "server URL" included in the data utilization item 112 is previously transmitted from the PC 22 (YES in S16 of FIG. 8; A3 of FIG. 7), it is deleted from the item list. Alternatively, of the data utilization items 112, an item corresponding to information previously stored in the storage device 48 may not be included in the item list by the control device 50 in a stage where the item list is prepared in S52. Where, of items included in the item list, no item corresponding to information stored in the storage device 48 is found (NO in S54), the control device 50 proceeds to S58.

In S58, the control device 50 determines whether there are overlapping items in the item list. Where it is determined that overlapping items exist (YES in S58), the control device 50 deletes one of the overlapping items from the registration item list (S60) and terminates the processing. Specifically, in S60, the control device 50 deletes one of the items included commonly in the server registration items 102 and the data utilization items 112. Since the "kind of data" included commonly in the server registration items 102 and the data utilization items 112 is overlapping in the item list, the control device 50 deletes one of the overlapping items. Where it is determined that no overlapping items exist (NO in S58), the control device 50 terminates the processing.

(Processing by PC)

Figure 10:
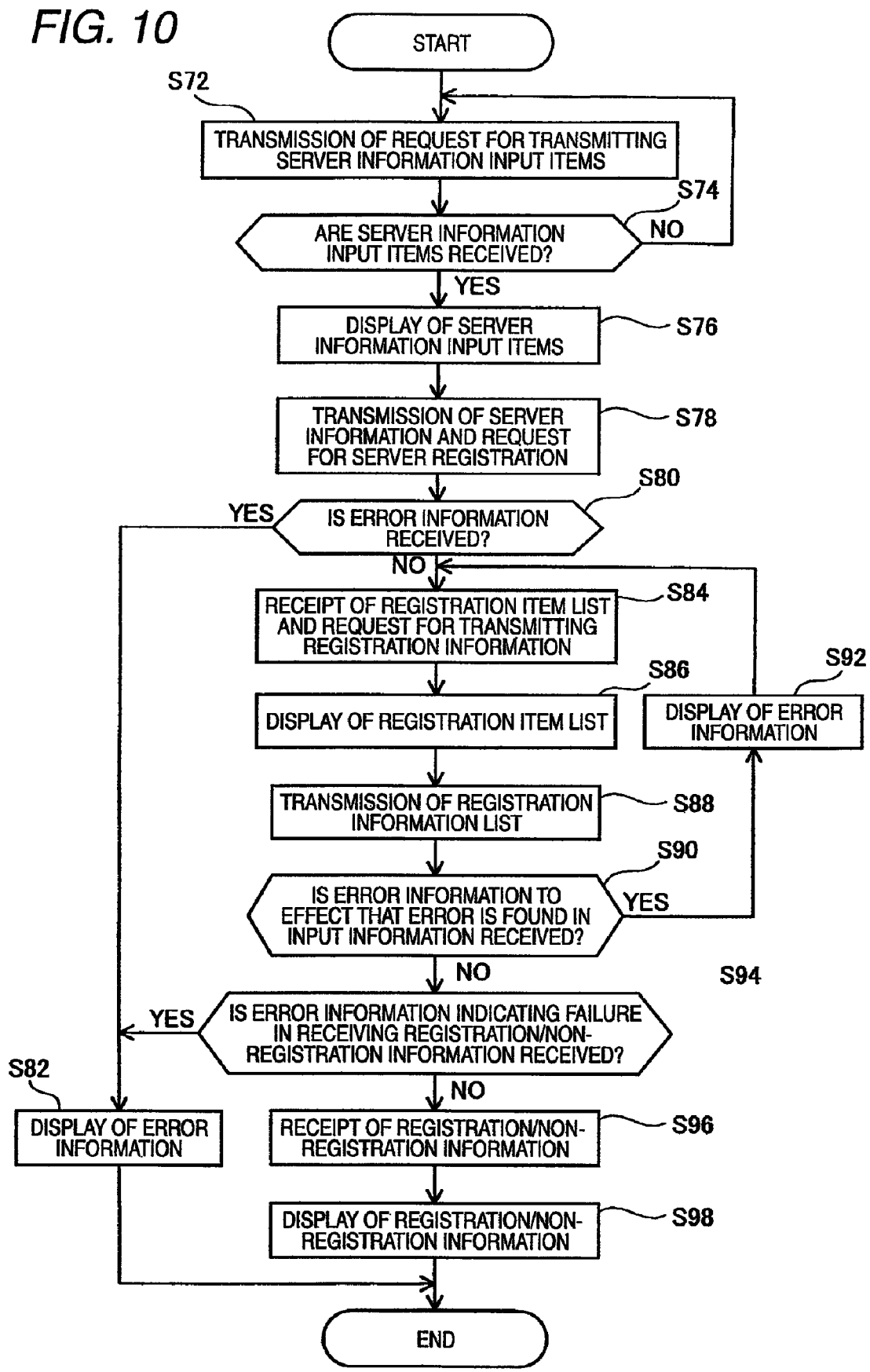
FIG. 10 is a flowchart showing the registration processing executed by the PC according to an exemplary embodiment of the present invention.

FIG. 10 is a flowchart showing an example of procedures for registration processing executed by the control device 68 of the PC 22. The process begins when an instruction to transmit a request for transmitting server information input items (A1 of FIG. 7) to the multi-function device 20 is input to the PC 22. The control device 68 transmits the request for transmitting server information input items to the multi-function device 20 (S72; A1 of FIG. 7). It is determined whether server information input items are received (S74). When it is determined that no server information input items are received from the multi-function device 20 (NO in S74), the control device 68 returns to S72. In this instance, the control device 68 may allow the display device 62 to display information which indicates that no server information input items have been received from the multi-function device 20. It is thus possible to confirm on the display device 62 whether the multi-function device 20 is normally operated.

When it is determined that the server information input items are received from the multi-function device 20 (YES in S74; A2 of FIG. 7), the control device 68 allows the display device 62 to display the server information input items (S76). The operation device 64 is operated, thus making it possible to input into the PC 22 information corresponding to the server information input items displayed on the display device 62. For example, a server which should supply data to the multi-function device 20 from the servers 14, 16, 18 or others may be input. A URL of the thus selected server (hereinafter, referred to as the server 14) may also be input into the PC 22. Upon input of the server information which is information corresponding to the server information input items (e.g., the URL of the server 14, etc.), the control device 68 transmits the server information and a request for server registration to the multi-function device 20 (S78; A3, A4 of FIG. 7).

The control device 68 confirms whether error information is received from the multi-function device 20 after the server information is transmitted to the multi-function device 20 (S80). The error information is transmitted from the multi-function device 20 in S48 of FIG. 8. Where the error information is received (YES in S80), the control device 68 allows the display device 62 to display the thus received error information (S82). In this stage, the error information transmitted from the multi-function device 20 is one of either the information indicating that the multi-function device 20 fails in connecting to the server 14 or the information indicating that the multi-function device 20 fails in receiving the server registration items from the server 14.

Where no error information is received (NO in S80), the control device 68 receives, from the multi-function device 20, a registration item list and a request for transmitting registration information (S84; A5, A6 of FIG. 7). Upon receipt of the registration item list, the control device 68 allows the display device 62 to display the registration item list (S86). The operation device 64 is operated, thus making it possible to input into the PC 22 information corresponding to an item included in the registration item list displayed on the display device 62. The control device 68 transmits the information corresponding to items included in the registration item list as the registration information list to the multi-function device 20 (S88; A7 of FIG. 7).

Where error information to the effect that the information input from the multi-function device 20 includes an error is received after transmission of the registration information list to the multi-function device 20 (YES in S90), the control device 68 allows the display device 62 to display the thus received error information (S92). The control device 68 returns to S86 and allows the display device 62 to display the registration item list. In this instance, the registration information list is displayed, and an error-including item and an error-free item may be displayed differently (for example, the error-including item is displayed in red) so that the error-including item can be easily discriminated.

Where error information to the effect that the information input from the multi-function device 20 includes an error is not received (NO in S90) but error information indicating a failure in receiving registration/non-registration information from the multi-function device 20 is received (YES in S94), the control device 68 allows the display device 62 to display the thus received error information (S82), thereby terminating the processing. A case in which the registration/non-registration information is not received is, for example, a case in which the server 14 is not normally operated. It is thus possible to confirm the error information displayed on the display device 62 and again start the registration processing in a short time.

Where the error information indicating a failure in receiving the registration/non-registration information from the multi-function device 20 is not received (NO in S94) but the registration/non-registration information is received (S96), the control device 68 allows the display device 62 to display the thus received registration/non-registration information (S98), thereby terminating the processing.

(Processing by Server)

Figure 11:
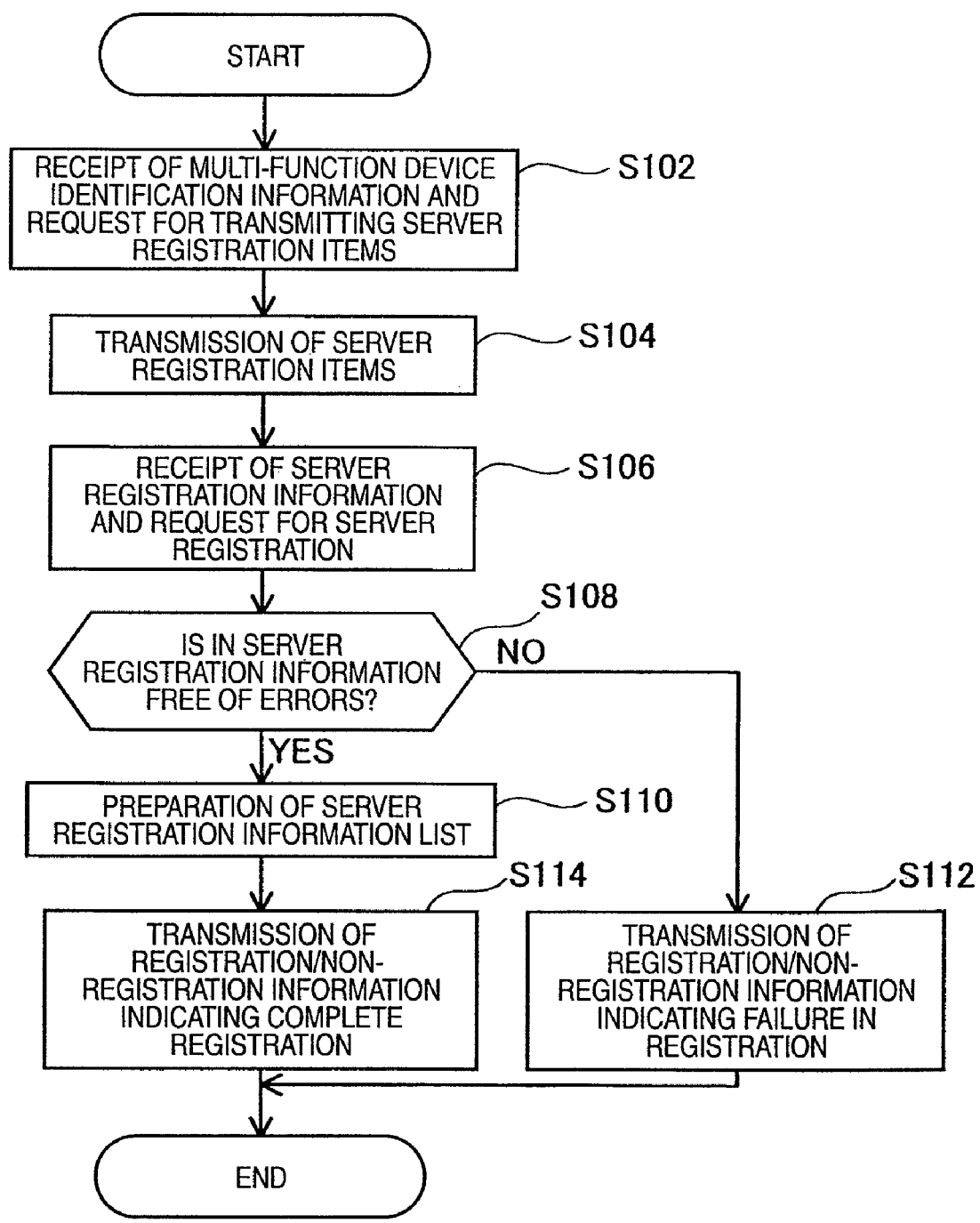
FIG. 11 is a flowchart showing the registration processing executed by the server according to an exemplary embodiment of the present invention.

FIG. 11 is a flowchart showing the procedures for registration processing executed by the control device 32 of the server 14. The control device 32 receives from the multi-function device 20 the identification information of the multi-function device 20 and a request for transmitting server registration items (S102; B1, B2 of FIG. 7). The control device 32 transmits the server registration items 102 to the multi-function device 20 specified by the thus received identification information according to the request for transmitting server registration items (S104; B3 of FIG. 7). Upon receipt of the server registration information and a request for registration from the multi-function device 20 (S106; B4, B5 of FIG. 7), the control device 32 confirms whether any error is found in the thus received server registration information (S108). A case in which an error is found in the server registration information is, for example, a case in which information corresponding to one item of the server registration items is not included, or alternatively a case in which "male" is input as information corresponding to the item of "birth date," that is, information different from the expected information for an item. Where an error is found in the received server registration information (NO in S108), the control device 32 transmits to the multi-function device 20 the registration/non-registration information indicating failure in registration (S112; B6 of FIG. 7) and terminates the processing. The control device 32 may transmit to the multi-function device 20 information indicating error information corresponding to a certain item of the server registration items, together with the registration/non-registration information indicating failure in registration. On the other hand, where no error is found in the received server registration information (YES in S108), the control device 32 prepares a new server registration information list and allows the hard disk 34 to store the list (S110). Then, the control device 32 transmits to the multi-function device 20 the registration/non-registration information indicating the complete registration (S114; B6 of FIG. 7) and terminates the processing.

In the above-described exemplary embodiment, a description was given for the processing of individual devices in a case where the multi-function device 20 was registered in the server 14. However, where the multi-function device 20 is registered in the server 16 or the server 18, the server information of the server 16 or the server 18 may be into the PC 22 as information corresponding to the server information input items displayed on the display device 62 in S76 of FIG. 10. The individual devices are able to execute the processing by executing similar processing as that described above with respect to the server 14.

A detailed description was given for the data utilization system 10 according to an exemplary embodiment of the present invention. In the data utilization system 10, where the multi-function device 20 is registered in the servers 14, 16, 18, it is possible to use the PC 22 to input the server registration information and the data utilization information. Specifically, the operation device 64 (such as a keyboard and a mouse) of the PC 22 may be operated, thus making it possible to input the server registration information and the data utilization information. According to the data utilization system 10, it is possible to alleviate input work of information performed by the user.

Further, where the server registration items 102 and the data utilization items 112 are transmitted to the PC 22, the multi-function device 20 of the data utilization system 10 transmits them as a single item list covering the server registration items 102 and the data utilization items 112. In this instance, the multi-function device 20 deletes one of the items commonly included in the server registration items 102 and the data utilization items 112. Thereby, a user is not requested to input the same information twice. The multi-function device 20 also deletes items corresponding to the information stored in the storage device 48, among the item list covering the server registration items 102 and the data utilization items 112. Thereby, it is possible to decrease the information which must be input by the user.

Further, the above-described multi-function device 20 stores the data utilization information list 110 after receipt of the registration/non-registration information indicating the complete registration from the servers 14, 16, 18. According to this constitution, in synchronization with the servers 14, 16, 18 which register the multi-function device 20, the multi-function device 20 can be put in a state of using data from the servers 14, 16, 18. In the above-described exemplary embodiment, the multi-function device 20 transmits the server registration information to the server 14 without the PC 22 (B5 of FIG. 7). As a result, the server registration information list 100 (i.e., information on the multi-function device 20 and others) is registered in the server 14. Further, the server 14 transmits the registration/non-registration information to the multi-function device 20 without the PC 22 (B6 of FIG. 7). As a result, the data utilization information list 110 (i.e., information on the server 14 and others) is registered in the multi-function device 20. According to this system 10, it is not necessary to make communications via the PC 22 during the time when the registration processing is carried out respectively in the multi-function device 20 and the server 14 after transmission of the server registration information from the multi-function device 20 to the server 14. Therefore, even if the PC 22 is switched off after the processing of A7 of FIG. 7 is terminated, it is possible to synchronize timing at which the registration processing is executed in the multi-function device 20 with timing at which the processing is executed in the server 14.

Still further, the multi-function device 20 of the data utilization system 10 confirms whether information corresponding to all the data utilization items is included in the registration information list received from the PC 22. After confirmation that the information corresponding to all the data utilization items is included, the multi-function device 20 transmits the server registration information to the server 14.

Further, technical elements described in the present specification and drawings exhibit technical usefulness solely or in combination thereof and shall not be limited to combinations described in claims at the time of filing. Still further, the technology shown in the present specification and drawings is to attain a plurality of objects at the same time, having the technical usefulness by attaining one of the objects in itself.

According to an exemplary embodiment of the present invention, there is provided a data utilization device which is capable of using data supplied from a server and which is also coupled to a user terminal so as to make communication possible. It is noted that the term "utilization of data" is to be interpreted as broadly as possible, and this is a concept which includes the output of data (e.g., display, printing, external transmission), processing of data, calculation based on the data. The data utilization device is provided with data utilization information storing unit, first command receiving unit, second command transmitting unit, server registration item receiving unit, third command transmitting unit, server registration information receiving unit, fourth command transmitting unit, response receiving means and storage control unit. The data utilization information storing unit is able to store data utilization information for utilizing data supplied from a server. The first command receiving unit receives a first command transmitted from a user terminal. The second command transmitting unit transmits a second command to a specific server specified by address information included in the first command according to the first command. The server registration item receiving unit receives server registration items transmitted from the specific server according to the second command. The server registration items may include, for example, items corresponding to address information of the data utilization device and identification information as well as items corresponding to types of data supplied by the server. The third command transmitting unit transmits a third command including server registration items to the user terminal. The server registration information receiving unit receives the server registration information transmitted from the user terminal according to the third command. The fourth command transmitting unit transmits a fourth command including the server registration information to the specific server. The response receiving unit receives a response with respect to the supply of data transmitted from the specific server according to the fourth command. The storage control unit allows the data utilization information storing unit to store the data utilization information for utilizing data supplied from the specific server on the condition that the response is an affirmative response. The data utilization information may include, for example, the address information of the server.

The data utilization device may receive the server registration items from the server and transmit the server registration items to the user terminal. The user terminal is operated, thus making it possible to input the server registration information. Therefore, in a case in which the data utilization device is not fully equipped with an operation device or a display device, the user terminal fully equipped with an operation device and a display device may be used, thus making it possible to input the server registration information. According to this technology, it is possible to alleviate input work performed by a user.

Further, when the data utilization device uses the data supplied from the server, the data utilization device is registered in the server on the basis of server registration information (for example, information on the data utilization device). Data utilization information (for example, information on the server) is also registered in the data utilization device. For example, when the data utilization device is registered in the server but the data utilization information is not registered in the data utilization device, the data utilization device is unable to use the data from the server. Conversely, when the data utilization information is registered in the data utilization device but the data utilization device is not registered in the server, the server will not supply data to the data utilization device, despite the fact that, for example, the data utilization device makes a request for the data to the server.

Additionally, the server may transmit an affirmative response to the data utilization device according to a fourth command including the server registration information. Specifically, the server transmits the affirmative response to the data utilization device where the server registration information included in the fourth command is complete to register the data utilization device. In this instance, the data utilization device is registered in the server. The storage control unit of the data utilization device allows the data utilization information storing unit to store the data utilization information on the condition that the affirmative response is received from the server. On the other hand, when the server registration information received by the server is incomplete, the server will not register the data utilization device or will not transmit the affirmative response to the data utilization device (for example, a negative response may be transmitted or no response may be made). The storage control unit of the data utilization device will not allow the data utilization information storing means to store the data utilization information, unless the affirmative response is received from the server.

Accordingly, it is possible to prevent such a case that despite the fact that the data utilization device has been registered in the server, the data utilization device does not store the data utilization information or despite the fact that the data utilization device has not been registered in the server, the data utilization device stores the data utilization information.

The above-described data utilization information may be input into a user terminal and transmitted from the user terminal to the data utilization device. Where the data utilization information is input, the third command transmitting unit may transmit to the user terminal a third command including server registration items and data utilization items corresponding to the data utilization information. Then, the server registration information receiving unit may receive the server registration information and the data utilization information transmitted from the user terminal according to the third command.

According to this constitution, the user terminal may be operated, thus making it possible to input the data utilization information. Thereby, it is possible to alleviate input work of the data utilization information performed by the user.

The third command transmitting unit may delete one of the items common to the server registration items and the data utilization items, thereby transmitting the third command including items except the deleted item to the user terminal.

According to this constitution, it is not required to input the same information twice, thus making it possible to alleviate the input work performed by the user.

The third command transmitting unit may delete a server registration item corresponding to information contained by the data utilization device, among server registration items received by the server registration item receiving unit, and transmit the third command including items except the deleted item to the user terminal. In this instance, the fourth command transmitting unit may transmit to the specific server the fourth command including the server registration information transmitted from the user terminal according to the third command and information corresponding to the thus deleted server registration item.

The server registration items may include, for example, items corresponding to information contained by the data utilization device such as items corresponding to address information of the data utilization device and items corresponding to identification information of the data utilization device. In the above constitution, items corresponding to information contained by the data utilization device are not transmitted from the data utilization device to the user terminal. This constitution makes it possible to decrease information which should be input by a user and alleviate the input work performed by the user.

The above-described data utilization device may be a printer having printing means for printing data supplied from a server to use the data.

On the other hand, the data utilization device may be another type of device, such as a mobile terminal.

According to an exemplary embodiment of the present invention, there is also provided a data utilization system equipped with the above-described data utilization device. This data utilization system is provided with a server for supplying data, a data utilization device capable of utilizing the data supplied from the server and a user terminal coupled to the data utilization device so as to make communication possible. The data utilization device is provided with data utilization information storing unit, first command receiving unit, second command transmitting unit, server registration item receiving unit, third command transmitting unit, server registration information receiving unit, fourth command transmitting unit, response receiving unit and storage control unit. The data utilization information storing unit is able to store data utilization information for utilizing the data supplied from the server. The first command receiving unit receives a first command transmitted from the user terminal. The second command transmitting unit transmits a second command to a server specified by address information included in the first command according to the first command. The server registration item receiving unit receives server registration items transmitted from the server according to the second command. The third command transmitting unit transmits a third command including the server registration items to the user terminal. The server registration information receiving unit receives server registration information transmitted from the user terminal according to the third command. The fourth command transmitting unit transmits a fourth command including the server registration information to the server. The response receiving unit receives a response transmitted from the server. The storage control unit allows the data utilization information storing unit to store data utilization information for utilizing the data supplied from the server on the condition that the response is an affirmative response. The server is provided with second command receiving unit, server registration item transmitting unit, fourth command receiving unit, registration processing execution unit, and response transmitting unit. The second command receiving unit receives a second command transmitted from the data utilization device. The server registration item transmitting unit transmits server registration items to the data utilization device according to the second command. The fourth command receiving unit receives a fourth command transmitted from the data utilization device. The registration processing execution unit is able to execute registration processing for registering the data utilization device on the basis of the server registration information included in the fourth command according to the fourth command. The response transmitting unit transmits an affirmative response to the data utilization device on the condition that the data utilization device is registered by the registration processing execution unit. The user terminal is provided with first command transmitting unit, third command receiving unit, output unit, input permitting unit, and server registration information transmitting unit. The first command transmitting unit transmits a first command including address information of the server to the data utilization device. The third command receiving unit receives a third command transmitted from the data utilization device according to the first command. The output unit outputs server registration items included in the third command according to the third command. The input permitting unit permits input of server registration information corresponding to the server registration items output by the output unit. The server registration information transmitting unit transmits the server registration information input by the input permitting unit to the data utilization device.

According to the data utilization system, the user terminal is operated, thus making it possible to perform input information for registering the data utilization device in the server. It is, thereby, possible to alleviate the input work performed by the user. It is also possible to prevent such a case that despite the fact that the data utilization device has been registered in the server, the data utilization device does not store the data utilization information, or despite the fact that the data utilization device has not been registered in the server, the data utilization device stores the data utilization information.

While the present invention has been shown and described with reference to certain exemplary embodiments thereof, it will be understood by those skilled in the art that various changes in form and details may be made therein without departing from the spirit and scope of the invention as defined by the appended claims.

What is claimed is:

1. A data utilization device that is to be connected to a terminal device and a server, the data utilization device comprising:
 a processor;
 a data utilization information registering unit that registers data utilization information for using data;
 a first command receiving unit that receives a first command from the terminal device;
 a second command transmitting unit that transmits a second command to the server specified by address information included in the first command;
 a server registration item receiving unit that receives server registration items from the server, in response to the second command transmitting unit transmitting the second command, wherein the server registration items correspond to server registration information that is to be registered in the server;
 a third command transmitting unit that transmits a third command including the server registration items and data utilization items to the terminal device, wherein the data utilization items correspond to data utilization information that is to be registered in the data utilization device;
 a server registration information receiving unit that receives the server registration information and the data utilization information from the terminal device, in response to the third command transmitting unit transmitting the third command;
 a fourth command transmitting unit that transmits a fourth command including the server registration information to the server;
 a response receiving unit that receives from the server a response with respect to the supply of data to be utilized, in response to the fourth command transmitting unit transmitting the fourth command; and
 a registration control unit that controls the data utilization information registering unit to register the data utilization information from the terminal device for using the data if the response is an affirmative response.

2. The data utilization device according to claim 1, wherein the third command transmitting unit deletes an item that is common to the server registration items and the data utilization items before transmitting the third command.

3. The data utilization device according to claim 1, wherein
the third command transmitting unit deletes a server registration item corresponding to information contained by the data utilization device, among the server registration items received by the server registration item receiving unit, before transmitting the third command, and
the fourth command transmitting unit transmits the fourth command including the server registration information received in response to the third command, and information corresponding to the server registration item that is deleted.

4. The data utilization device according to claim 1, wherein the data utilization information registered by the data utilization information registering unit includes the address information specifying the server.

5. The data utilization device according to claim 1, wherein the data utilization device comprises a printer that prints an image according to the data supplied from the server.

6. The data utilization device according to claim 1, further comprising a data forming unit configured to form the data,
wherein the data forming unit utilizes the data utilization information to form the data.

7. The data utilization device according to claim 1, further comprising a printing unit configured to print an image based on the data stored in the server,
wherein the printing unit utilizes the data utilization information to form the image stored in the server.

8. A data utilizing method in a data utilization device that is to be connected to a terminal device and a server, the data utilizing method comprising:
transmitting a first command from the terminal device to the data utilization device, the command including address information of the server;
receiving at the data utilization device the first command from the terminal device;
transmitting a second command from the data utilization device to the server, the server being specified by address information included in the first command;
receiving at the server the second command transmitted from the data utilization device;
transmitting server registration items from the server to the data utilization device in response to the second command, the server registration items corresponding to server registration information that is to be registered in the server;
receiving at the data utilization device the server registration items from the server
transmitting from the data utilization device a third command including the server registration items and data utilization items to the terminal device, wherein the data utilization items correspond to data utilization information that is to be registered in the data utilization device;
receiving at the terminal device the third command transmitted from the data utilization device in response to the first command;
outputting at the terminal device the server registration items and the data utilization items included in the third command;
permitting at the terminal device input of the server registration information corresponding to the server registration items and the data utilization information corresponding to the data utilization items;
transmitting the server registration information and the data utilization information input at the terminal device from the terminal device to the data utilization device,
receiving at the data utilization device the server registration information and the data utilization information from the terminal device in response to the third command;
transmitting a fourth command including the server registration information from the data utilization device to the server;
receiving at the server the fourth command transmitted from the data utilization device;
executing registration processing at the server for registering the server registration information included in the fourth command; and
transmitting an affirmative response from the server to the data utilization device on a condition that the server registration information is successfully registered at the server;
receiving at the data utilization device a response from the server with respect to the supply of data to be utilized, in response to the fourth command; and
controlling a data utilization information registering unit at the data utilization device to register the data utilization information from the terminal device for using the data supplied from the server if the response from the server is an affirmative response.

9. A data utilization system that is provided with a server for supplying data, a data utilization device capable of utilizing data supplied from the server and a terminal device coupled to the data utilization device so as to make communication possible,
the data utilization device comprising:
a data utilization information registering unit that registers data utilization information for using data;
a first command receiving unit that receives a first command transmitted from the terminal device;
a second command transmitting unit that transmits a second command to the server specified by address information included in the first command;
a server registration item receiving unit that receives server registration items transmitted from the server in response to the second command, wherein the server registration items correspond to server registration information that is to be registered in the server;
a third command transmitting unit that transmits a third command including the server registration items and data utilization items to the terminal device, wherein the data utilization items correspond to data utilization information that is to be registered in the data utilization device;
a server registration information receiving unit that receives the server registration information and the data utilization information transmitted from the terminal device in response to the third command;
a fourth command transmitting unit that transmits a fourth command including the server registration information to the server;
a response receiving unit that receives from the server a response with respect to the supply of data to be utilized, in response to the fourth command; and
a registration control unit that controls the data utilization information registering unit to register the data utilization information from the terminal device for using the data if the response received in response to the fourth command is an affirmative response, the server comprising:
- a second command receiving unit that receives the second command transmitted from the data utilization device;
- a server registration item transmitting unit that transmits the server registration items to the data utilization device in response to the second command;
- a fourth command receiving unit that receives the fourth command transmitted from the data utilization device;
- a registration processing execution unit that executes registration processing for registering the data utilization device on the basis of the server registration information included in the fourth command; and
- a response transmitting unit that transmits an affirmative response to the data utilization device on a condition that the data utilization device is successfully registered by the registration processing execution unit, and the terminal device comprising:
- a first command transmitting unit that transmits the first command including address information of the server to the data utilization device;
- a third command receiving unit that receives the third command transmitted from the data utilization device in response to the first command;
- an output unit that outputs the server registration items included in the third command;
- an input permitting unit that permits input of the server registration information corresponding to the server registration items output by the output unit; and
- a server registration information transmitting unit that transmits the server registration information input by the input permitting unit to the data utilization device.

* * * * *